United States Patent [19]
Jung et al.

[11] Patent Number: 5,093,408
[45] Date of Patent: Mar. 3, 1992

[54] HYDROXYLIC ACRYLATE COPOLYMER, PROCESS FOR ITS PREPARATION, AND COATING AGENT BASED ON THE ACRYLATE

[75] Inventors: Werner Jung, Ascheberg; Christoph Klesse, Limburghof; Axel Sievers, Münster, all of Fed. Rep. of Germany

[73] Assignee: BASF Lacke & Farben AG, Munster, Fed. Rep. of Germany

[21] Appl. No.: 366,768

[22] Filed: Jun. 15, 1989

Related U.S. Application Data

[62] Division of Ser. No. 134,576, Dec. 8, 1987, Pat. No. 4,880,889.

[30] Foreign Application Priority Data

Apr. 4, 1985 [DE] Fed. Rep. of Germany ....... 3412434

[51] Int. Cl.$^5$ .......................................... C08F 220/06
[52] U.S. Cl. ..................................... 524/512; 524/558
[58] Field of Search ................................ 524/512, 558

[56] References Cited

U.S. PATENT DOCUMENTS 4,711,944 12/1987 Sherwin ..................... 526/318.24

Primary Examiner—Joseph L. Schofer
Assistant Examiner—Jeffrey T. Smith
Attorney, Agent, or Firm—Kenyon & Kenyon

[57] ABSTRACT

The invention relates to a hydroxylic acrylate copolymer which contains a proportion of copolymerized monomers having at least 2 double bonds, and to the process for the preparation of the acrylate copolymer. The invention also relates to coating agents which contain acid-curable binders, organic solvents and, if appropriate, pigments, fillers and conventional assistants and additives and which contain, as the essential binder, the hydroxylic acrylate copolymer and an alkylated melamine/formaldehyde resin. The invention also relates to coating agents which, as the essential binders, contain the hydroxylic acrylate copolymer in one or more different polyfunctional isocyanates.

11 Claims, No Drawings

HYDROXYLIC ACRYLATE COPOLYMER, PROCESS FOR ITS PREPARATION, AND COATING AGENT BASED ON THE ACRYLATE

This application is a division of application Ser. No. 134,576, filed Dec. 8, 1987, now U.S. Pat. No. 4,880,889.

The invention relates to a hydroxylic acrylate copolymer produced by copolymerization of acrylates having at least 2 olefinically unsaturated (sic) double bonds, hydroxylic monomers and further olefinically unsaturated monomers.

EP-A 103,199 has disclosed an acrylate copolymer of the abovementioned type. EP-A 103,199 has also disclosed the processing of the copolymer of the abovementioned type with a suitable crosslinking agent to give a coating agent. An etherified amine/formaldehyde resin is mentioned inter alia as a crosslinking agent.

Moreover, EP-A 64,338 has disclosed an acid-curable coating agent based on an acrylate copolymer and a melamine/formaldehyde resin.

It is the object of the present invention to provide a crosslinkable acrylate copolymer and coating agents which are based on the crosslinkable acrylate copolymer and have an improved fastness to gasoline and an improved resistance to long-term exposure to water or steam.

The object is achieved by a hydroxylic acrylate copolymer of the abovementioned type, which has been obtained from a₁) 10 to 60% by weight, preferably 15 to 60% by weight, of hydroxylic esters of acrylic/methacrylic acid, having 2 to 14 carbon atoms in the alkyl radical, a₂) 3 to 25% by weight, preferably 5 to 20% by weight, of monomers having at least 2 polymerizable olefinically unsaturated double bonds, and a₃) 15 to 82% by weight, preferable 40 to 70% by weight, of further polymerizable monomers having one olefinically unsaturated (sic) double bond, the sum of components a₁, a₂ and a₃ being 100% by weight.

Compounds of the general formula

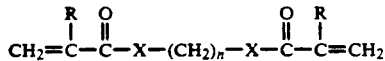

where
R = H or CH₃,
X = O, N or S
n = 2 to 8, can advantageously be used as the component a₂.

Examples of such compounds are hexanediol diacrylate, hexanediol dimethacrylate, glycol diacrylate, glycol dimethacrylate, butanediol diacrylate, butanediol dimethacrylate and similar compounds.

The component a₂ can advantageously also be a reaction product of a carboxylic acid having a polymerizable olefinically unsaturated double bond and glycidyl acrylate and/or glycidylmethacrylate, or a polycarboxylic acid or unsaturated monocarboxylic acid esterified with an unsaturated alcohol.

Moreover, the component a₂ can advantageously be a reaction product of a polyisocyanate and an unsaturated alcohol or amine. The reaction product of one mol of hexamethylene diisocyanate and 2 mol of allyl alcohol may be mentioned as an example.

Another advantageous component a₂ is a diester of polyethylene glycol and/or polypropylene glycol of a mean molecular weight of less than 1500, preferably less than 1000, and acrylic and/or methacrylic acid. According to the invention, acrylates having more than 2 ethylenically unsaturated double bonds, for example trimethylolpropane triacrylates or trimethylolpropane trimethacrylate, can also be used as the component a₂. Of course, combinations of these polyunsaturated monomers can also be used.

The component a₁ can especially be a hydroxyalkyl ester of acrylic and/or methacrylic acid, having a primary hydroxyl group, for example hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates.

Advantageously, the component a₁ can at least partially be a reaction product of one mol of hydroxyethyl acrylate and/or hydroxyethyl methacrylate and, on average, 2 mol of ε-caprolactone.

Advantageously, up to 75% by weight, and particularly preferably up to 50% by weight, of the component a₁ can also be a hydroxylic acrylic and/or methacrylic acid ester with a secondary hydroxyl group, in particular a reaction product of acrylic and/or methacrylic acid and the glycidyl ester of a carboxylic acid having a tertiary α-carbon atom. 2-Hydroxypropyl acrylate, 2-hydroxybutyl acrylate, 3-hydroxybutyl acrylate and the corresponding methacrylates may be mentioned as examples.

The choice of the further polymerizable monomers of component a₃ is not particularly critical. These can be chosen from the group comprising styrene, vinyltoluene, acrylic acid, methacrylic acid, alkyl esters of acrylic and methacrylic acid, alkoxyethyl acrylates and aryloxyethyl acrylates and the corresponding methacrylates, and the esters of maleic and fumaric acids. Examples of these are methyl acrylate, ethyl acrylate, propyl acrylate, butyl acrylate, isopropyl acrylate, isobutyl acrylate, pentyl acrylate, isoamyl acrylate, hexyl acrylate, 2-ethylhexyl acrylate, octyl acrylate, 3,5,5-trimethylhexyl acrylate, decyl acrylate, dodecyl acrylate, hexadecyl acrylate, octadecyl acrylate, octadecenyl acrylate, pentyl methacrylate, isoamyl methacrylate, hexyl methacrylate, 2-ethylbutyl methacrylate, octyl methacrylate, 3,5,5-trimethylhexyl methacrylate, decyl methacrylate, dodecyl methacrylate, hexadecyl methacrylate, octadecyl methacrylate, alkoxyethyl acrylates or methacrylates, such as butoxyethyl acrylate or butoxyethyl methacrylate, methyl methacrylate, ethyl methacrylate, propyl methacrylate, isopropyl methacrylate, butyl methacrylate, cyclohexyl acrylate, cyclohexyl methacrylate, acrylonitrile, methacrylonitrile, vinyl acetate, vinyl chloride and phenoxyethyl acrylate. Other monomers can be used, unless they cause undesirable properties of the copolymer.

The invention also relates to a process for the preparation of an acrylate copolymer, which comprises copolymerizing, for its preparation, a₁) 10 to 60% by weight, preferably 15 to 60% by weight, of hydroxylic esters of acrylic and/or methacrylic acid, having 2 to 14 carbon atoms in the alkyl radical, a₂) 3 to 25% by weight, preferably 5 to 20% by weight, of monomers having at least 2 polymerizable olefinically unsaturated double bonds and a₃) 15 to 82% by weight, preferably 40 to 70% by weight, of further polymerizable monomers having one olefinically unsaturated double bond, in an organic solvent with the addition of polymerization initiators and polymerization regulators to give a precrosslinked, ungelled product, the sum of the components $a_1$, $a_2$ and $a_3$ being 100% by weight.

Care must be taken in order to obtain a precrosslinked, but ungelled copolymer. Surprisingly, a clear, transparent, ungelled solution of a branched copolymer can be prepared by means of suitable polymerization conditions. The use of monomers having at least 2 ethylenically unsaturated groups causes precrosslinking of the copolymer molecules, but due to the special reaction conditions according to the invention this nevertheless does not lead to gelled products. These special reaction conditions comprise carrying out the polymerization at temperatures from 80° to 130° C., preferably 90° to 120° C., at a relatively low polymerized solids content of about 50% by weight. Furthermore, it is necessary to use suitable initiators and, depending on the proportion of difunctional monomer, at least 0.5% by weight, but preferably at least 2.5% by weight, of a polymerization regulator (chain stopper), for example mercapto compounds. The choice of the initiator depends on the proportion of the difunctional monomers used. In the case of a low proportion, the initiators conventional for such temperatures, for example peroxy esters, can be used. In the case of a higher proportion of difunctional monomer, initiators such as azo compounds are preferably employed. After the polymerization, the polymer solution is concentrated to the desired solids content, preferably solids contents of 60% by weight, by distilling off the solvent. When adjusted to a solids content of 50% by weight, the clear copolymer solutions thus obtained have a viscosity of 0.4 to 10 dPas.

Surprisingly, measurements on the acrylate copolymer solutions by means of photon-correlation spectroscopy do not indicate any microgel content.

The invention also relates to a coating agent which contains a binder, organic solvents, if appropriate pigments, fillers and conventional assistants and additives and, if appropriate, is curable by means of a catalyst and which, as the essential binder, contains the acrylate copolymer according to the invention and a binder suitable for cross-linking the former.

The invention relates to a coating agent which is curable by means of acid and, as the essential binder, contains A) 55 to 90% by weight, preferably 70 to 80% by weight, of the acrylate copolymer according to the invention and B) 10 to 45% by weight, preferably 20 to 30% by weight, of a melamine/formaldehyde resin having a mean molecular weight from 250 to 1000 and a degree of a methylolation of at least 0.65, preferably 0.9 to 1, which resin is etherified with monoalcohols having 1 to 4 carbon atoms and/or monoethers of diols having 2 to 7 carbon atoms in total, to an extent of at least 80 mol %, preferably 90 to 100 mol %, based on the maximum possible etherification, the sum of the binders A) and B) being 100% by weight.

Preferably, 25 to 40% by weight of the component $a_1$ is used, the sum of components $a_1$, $a_2$ and $a_3$ being 100% by weight.

The melamine/formaldehyde resin used as the binder B) can have been etherified with, for example, methanol, ethanol, propanol and butanol. Hexakis-(methoxy)-methylmelamine is very suitable. Of course, the component B can also consist of urea/formaldehyde and benzoguanamine formaldehyde resins.

Before they are used, the coating agents according to the invention are mixed with an acid catalyst, in order to reduce the curing temperature and to accelerate curing. The catalyst is used in a quantity of 1 to 5% by weight, preferably 1.5 to 3.5% by weight, based on the solids content of binders A) and B). Sulfonic acid compounds, in particular p-toluene sulfonic acid, are particularly suitable. Mixtures of catalysts can also be employed.

To extend the pot life to 6 to 24 hours after the addition of the catalyst, the coating agent advantageously contains a quantity of a nitrogen-containing compound, equivalent to the quantity of acid, or a part of this quantity, depending on the desired extension of the pot life.

An extension of the pot life can advantageously also be obtained by an addition of 5 to 35% by weight, based on the solids content of binder, of one or more alcohols, of which ethanol, butanol and mixtures thereof are preferred.

The invention also relates to a process for the preparation of an acid-curable coating agent, which comprises copolymerizing, for the preparation of an hydroxylic acrylate copolymer, A) $a_1$) 10 to 60% by weight, preferably 15 to 60% by weight, of hydroxylic esters of acrylic and/or methacrylic acid, having 2 to 14 carbon atoms in the alkyl radical, $a_2$) 3 to 25% by weight, preferably 5 to 20% by weight, of monomers having at least 2 polymerizable olefinically unsaturated (sic) double bonds and $a_3$) 15 to 82% by weight, preferably 40 to 70% by weight, of further polymerizable monomers having one olefinically unsaturated (sic) double bond, in an organic solvent with the addition of polymerization initiators and polymerization regulators to give a precross-linked, ungelled product, the sum of the components $a_1$, $a_2$ and $a_3$ being 100% by weight, and processing this copolymer A) in a proportion of 55 to 90% by weight, preferably 70 to 80% by weight, with B) 10 to 45% by weight, preferably 20 to 30% by weight, of a melamine/formaldehyde resin having a molecular weight from 250 to 1000 and a degree of methylolation of at least 0.65, preferably 0.9 to 1, which resin is etherified with monoalcohols of 1 to 4 carbon atoms and/or monoethers of diols having 2 to 7 carbon atoms in total, to an extent of at least 80 mol %, preferably 90 to 100 mol %, based on the maximum possible etherification, and with organic solvents and, if appropriate, pigments and conventional assistants and additives, by mixing and, if necessary, dispersing to give a coating composition, the sum of binders A) and B) being 100% by weight.

The invention also relates to a coating agent which, as the essential binder, contains the acrylate copolymer A) according to the invention and B) one or more different polyfunctional isocyanates, with the proviso that the ratio of the isocyanate groups and hydroxyl groups is within the range from 0.3:1 to 3.5:1.

Examples of polyfunctional isocyanates, which can be used for crosslinking the hydroxylic copolymers, are 2,4-toluylene diisocyanate, 2,6-toluylene diisocyanate, 4,4'-diphenylmethane diisocyanate, hexamethylene diisocyanate, 3,5,5-trimethyl-1-diocyanato-3-isocyanatomethylcyclohexane, m-xylylene diisocyanate, p-xylylene diisocyanate, tetramethylene diisocyanate, cyclohexane-1,4-diisocyanate, 4,4'-diisocyanatodiphenyl ether, 2,4,6-triisocyanatotoluene and 4,4',4''-triisocyanatotriphenylmethane. The polyisocyanates can be linked to give propolymers of higher molecular weight. Adducts of toluylene diisocyanate and trimethylolpropane, a biuret formed from 3 molecules of hexamethylene diisocyanate, and the trimers of hexamethylene diisocyanate and 3,5,5-trimethyl-1-isocyanato-3-isocyanatomethylcyclohexane may be mentioned here.

In the case of the acrylate copolymers crosslinked with isocyanate groups, preferably 15 to 40% by weight of component $a_1$ are used, the sum of components $a_1$, $a_2$ and $a_3$ being 100% by weight.

The invention also relates to a process for the preparation of the coating agent, which comprises copolymerizing, for the preparation of the acrylate copolymer, A) $a_1$) 10 to 60% by weight, preferably 15 to 60% by weight, of hydroxylic esters of acrylic and/or methacrylic acid, having 2 to 14 carbon atoms in the alkyl radical, $a_2$) 3 to 25% by weight, preferably 5 to 20% by weight, of monomers having at least 2 polymerizable olefinically unsaturated (sic) double bonds and $a_3$) 15 to 82% by weight, preferably 40 to 70% by weight, of further polymerizable monomers having one olefinically unsaturated (sic) double bond, in an organic solvent with the addition of polymerization initiators and polymerization regulators to give a pre-crosslinked, ungelled product, the sum of components $a_1$, $a_2$ and $a_3$ being 100% by weight, and processing this copolymer A) with B) one or more different polyfunctional isocyanates and with organic solvents and, if appropriate, pigments and conventional assistants and additives, by mixing and, if necessary, dispersing to give a coating composition, with the proviso that the ratio of the isocyanate groups and hydroxyl groups is within the range from 0.3:1 to 3.5:1.

In the process according to the invention, one or more catalysts in a quantity of 0.01 to 1% by weight, based on the solids content of the reacting components, can be used. The preferred catalysts used are amines, for example dimethylethanolamine. When catalysts are added the curing temperature can be reduced and curing can be accelerated. The isocyanate curing according to the invention can be carried out at temperatures as low as room temperature. At very high temperatures, the addition of a catalyst is unnecessary.

The coating agents according to the invention can be cured at low temperatures, for example at 20° to 80° C., and are therefore employed particularly for automobile finish repairs.

The invention also relates to a process for the preparation of a coating, wherein an acid catalyst in a quantity of 1 to 5% by weight, preferably 1.5 to 3.5% by weight, based on the solids content of binders A) and B), is admixed to a coating agent as claimed in claim 18 or 19, the mixture obtained is applied in the form of a film to a substrate by spraying, flooding, dipping, rolling, knife application or brushing and a film is cured at temperatures from 20° to 80° C. to give a firmly adhering coating.

The invention also relates to a process for the preparation of a coating, wherein a coating agent crosslinked in claim 21 or 22, to which a catalyst may have been admixed, is applied in the form of a film to a substrate by spraying, flooding, dipping, rolling, knife application or brushing and the film is cured to give a firmly adhering coating. The invention also relates to substrates coated by a process according to the invention.

The invention is explained in more detail below by reference to illustrative embodiments.

A) Preparation of copolymers according to the invention (Binder A)

In the examples which follow, all percentage figures relate to parts by weight, unless otherwise stated. The solids content values were determined in a circulating-air oven after 1 hour at 130° C. The viscosities were determined in a cone-and-plate viscometer.

1. Preparation of acrylate resin I 360 parts of butyl acetate and 180 parts of methoxypropyl acetate are introduced into a 3 l kettle.

The solvent mixture is heated to 110° C. Within 3 hours, the following are metered in uniformly:
Solution 1:
 300 parts of methyl methacrylate
 250 parts of styrene
 150 parts of hexanediol diacrylate
 250 parts of butanediol monoacrylate
 50 parts of n-butyl acrylate
 45 parts of mercaptoethanol
Solution 2:
 350 parts of butyl acetate
 30 parts of azobisisobutyronitrile
 175 parts of methoxypropyl acetate The polymerization is then completed during a further 3 hours at 110° C. A solids content of 50.5% is reached. About 340 parts of solvent are distilled off in vacuo at 60°-70° C. The clear, colorless acrylate resin solution has a solids content of 60.6%, an acid number of 0.1, an OH number of 97 and a viscosity of 2.0 dPas at 23° C. at a solids content adjusted to 50% with ethylglycol acetate.

2. Preparation of acrylate resin II 360 parts of butyl acetate and 180 parts of methoxypropyl acetate are introduced into a 3 l kettle.

The solvent mixture is heated to 110° C. Within 3 hours, the following are metered in uniformly:
Solution 1:
 300 parts of methyl methacrylate
 150 parts of styrene
 150 parts of hexanediol diacrylate
 400 parts of hydroxyethyl methacrylate
 45 parts of mercaptoethanol
Solution 2:
 350 parts of butyl acetate
 30 parts of azobisisobutyronitrile
 175 parts of methoxypropyl acetate.

The polymerization is then completed during a further 3 hours at 110° C. A solids content of 50.5% is reached. About 340 parts of solvent are distilled off in vacuo at 60°-70° C. The clear, colorless acrylate resin solution has a solids content of 61.4%, an acid number of 0.4, and an OH number of 173 and a viscosity of 6.6 dPas at 23° C. at a solids content adjusted to 50% with ethyl glycol acetate.

3. Preparation of acrylate resin III 360 parts of butyl acetate and 180 parts of methoxypropyl acetate are introduced into a 3 l kettle.

The solvent mixture is heated to 110° C. Within 3 hours, the following are metered in uniformly:
Solution 1:

300 parts of methyl methacrylate
150 parts of styrene
150 parts of hexanediol diacrylate
150 parts of hydroxyethyl methacrylate
250 parts of butanediol monoacrylate
45 parts of mercaptoethanol
Solution 2:
350 parts of butyl acetate
30 parts of azobisisobutyronitrile
175 parts of methoxypropyl acetate.

The polymerization is then completed during a further 3 hours at 110° C. A solids content of 49.8% is reached. About 340 parts of solvent are distilled off in vacuo at 60°-70° C. The clear, colorless acrylate resin solution has a solids content of 60.9%, an acid number of 0.3, and an OH number of 162 and a viscosity of 3.8 dPas at 23° C. at a solids content adjusted to 50% with ethylglycol acetate.

4. Preparation of acrylate resin IV 240 parts of butyl acetate, 120 parts of methoxypropyl acetate and 10 parts of tert.-butylperoxy 2-ethylhexanoate are introduced into a 3 l kettle.

The solvent mixture and a part of the required quantity of initiator are heated to 110° C. Within 3 hours, the following are metered in uniformly:
Solution 1:
300 parts of methyl methacrylate
250 parts of styrene
75 parts of hexanediol diacrylate
75 parts of hydroxyethyl methacrylate
250 parts of butanediol monoacrylate
50 parts of n-butyl acrylate
35 parts of mercaptoethanol
Within 3.5 hours, the following are metered in uniformly:
Solution 2:
240 parts of butyl acetate
35 parts of tert.-butylperoxy 2-ethylhexanoate
120 parts of methoxypropyl acetate.

The polymerization is then completed during a further 3 hours at 110° C. The clear, colorless acrylate resin solution has a solids content of 61.5%, an acid number of 4.1, and an OH number of 130 and a viscosity of 4.8 dPas at 23° C., at a solids content adjusted to 50% with ethylglycol acetate.

5. Preparation of acrylate resin V 360 parts of butyl acetate, 180 parts of methoxypropyl acetate and 10 parts of tert.-butylperoxy 2-ethylhexanoate are introduced into a 3 l kettle.

The solvent mixture is heated to 110° C. Within 3 hours, the following are metered in uniformly:
Solution 1:
300 parts of methyl methacrylate
250 parts of styrene
75 parts of hexamethylene-bis-methacrylamide
75 parts of hydroxyethyl methacrylate
250 parts of butanediol monoacrylate
50 parts of n-butyl acrylate
35 parts of mercaptoethanol
Within 3.5 hours, the following are metered in uniformly:
Solution 2:
350 parts of butyl acetate
35 parts of tert.-butylperoxy 2-ethylhexanoate
175 parts of methoxypropyl acetate The polymerization is then completed during a further 3 hours at 110° C. The solids content of 50.9% is reached. About 340 parts of solvent are distilled off in vacuo at 60°-70° C. The clear, colorless acrylate resin solution has a solids content of 61.5%, an acid number of 3.1, an OH number of 130 and a viscosity of 3.6 dPas at 23° C. at a solids content adjusted to 50% with ethylglycol acetate.

6. Preparation of acrylate resin VI 361 parts of butyl acetate and 181 parts of ethylglycol acetate are introduced into a 3 l kettle.

The solvent mixture is heated to 110° C. Within 3 hours, the following are metered in uniformly:
Solution 1:
300 parts of methyl methacrylate
250 parts of styrene
150 parts of ethylene glycol dimethacrylate
250 parts of butanediol monoacrylate
50 parts of n-butyl acrylate
45 parts of mercaptoethanol
Solution 2:
350 parts of butyl acetate
30 parts of azobisisobutyronitrile (sic)
175 parts of ethyl glycol acetate.

The polymerization is then completed during a further 3 hours at 110° C. A solids content of 48.9% is reached. About 340 parts of solvent are distilled off in vacuo at 60°-70° C. The clear, colorless acrylate resin solution has a solids content of 59.1%, an acid number of 1.6, an OH number of 97 and a viscosity of 6.5 dPas at 23° C. at a solids content adjusted to 50% with ethylglycol acetate.

7. Preparation of acrylate resin VII 361 parts of butyl acetate and 181 parts of ethyl glycol acetate are introduced into a 3 l kettle. The solvent mixture is heated to 110° C. Within 3 hours, the following are metered in uniformly:
Solution 1:
300 parts of methyl methacrylate
150 parts of styrene
150 parts of hexanediol diacrylate
250 parts of butanediol monoacrylate
150 parts of a 1:2 reaction product of 2-hydroxyethyl acrylate and caprolactone, as described below
45 parts of mercaptoethanol
Solution 2:
350 parts of butyl acetate
30 parts of ethylglycol acetate
175 parts of ethylglycol acetate The polymerization is then completed during a further 3 hours at 110° C. A solids content of 50.3% is reached. About 340 parts of solvent are distilled off in vacuo at 60°-70° C. The clear, colorless acrylate resin solution has a solids content of 60.1%, an acid number of 0.7, an OH number of 122 and a viscosity of 7.4 dPas at 23° C. originally and a viscosity of 2.2 dPas at a solids content adjusted to 50% with ethylglycol acetate.

Reaction product of 2-hydroxyethyl acrylate and caprolactone

A commercially available reaction product, prepared from one mol of hydroxyethyl acrylate and, on average, 2 mol of ε-caprolactone, was used.

B) Preparation of tinting pastes for pigmented top coats

| White tinting paste P1 | |
|---|---|
| Acrylate resin I | 32.0 parts |
| Titanium dioxide, rutile | 53.0 parts |

-continued

| White tinting paste P1 | |
|---|---|
| Anti-settling agent | 1.0 part |
| (Salt of a higher-molecular polycarboxylic acid, 52% in higher-boiling aromatics) | |
| Xylene | 4.3 parts |
| Solvent mixture | 6.7 parts |
| (6:4 xylene/butyl acetate) | |
| Treated montmorrillonite | 2.0 parts |
| (10% in solvent naphtha/propylene carbonate/soya lecithin 85:4:1) | |
| Pyrogenic silica | 1.0 part |
| | 100.0 parts |

The items are successively stirred up in a dissolver and then dispersed for 20 minutes in a commercially available laboratory sand mill (10 μm fineness)

| Yellow tinting paste P2 | |
|---|---|
| Acrylate resin I | 67.3 parts |
| Anthrapyrimidine yellow (CI Y 108, 68,420) | 15.0 parts |
| Solvent mixture | 15.0 parts |
| (6:4 xylene/butyl acetate) | |
| Triethylenetetramine | 0.2 part |
| Xylene | 2.5 parts |
| | 100.0 parts |

The items are stirred up successively in a dissolver and then dispersed for 60 minutes in a commercially available laboratory sand mill (10 μm fineness).

| White tinting paste P3 with extraneous binder | |
|---|---|
| Solvent mixture (xylene/butyl acetate) | 5.4 parts |
| Commercially available OH-copolymer, OH number 150 based on solids, 60% in 2:1 xylene/ethylglycol acetate, viscosity (50% in xylene) 450-750 mPas | 31.1 parts |
| Anti-settling agent | 1.0 part |
| (Salt of a higher-molecular polycarboxylic acid, 52% in higher-boiling aromatics) | |
| Treated montmorrillonite | 2.0 parts |
| (10% in solvent naphtha/propylene carbonate soya lecithin 85:4:1) | |
| Pyrogenic silica | 0.5 part |
| Titanium oxide, rutile | 60.0 parts |
| | 100.0 parts |

The items are stirred up successively in the dissolver and then dispersed for 20 minutes in a commercially available laboratory sand mill (10 μm fineness).

| Green tinting paste | |
|---|---|
| Acrylate resin I | 38.6 parts |
| Titanium dioxide, rutile | 10.7 parts |
| Yellow pigment (Y34, C.I. 77,603) | 4.2 parts |
| Yellow pigment (Y34, C.I. 77,600) | 10.5 parts |
| Green pigment (G7, C.I. 74,260) | 0.5 parts |
| Butanol | 23.2 parts |
| Tetraline | 4.6 parts |
| Butyl acetate | 7.7 parts |
| | 100.0 parts |

The items are stirred up successively in a dissolver and then dispersed for 20 minutes in a commercially available laboratory sand mill (10 μm fineness).

| Red tinting paste | |
|---|---|
| Acrylate resin I | 46.3 parts |
| Red pigment (R104, C.I. 77,605) | 44.2 parts |

-continued

| Red tinting paste | |
|---|---|
| Wetting and dispersing additive | 1.0 part |
| (Partial amide and ammonium salt of a higher-molecular unsaturated polycarboxylic acid, combined with an organically modified siloxane copolymer) | |
| Ethylglycol acetate | 8.5 parts |
| | 100.0 parts |

The items are stirred up successively in a dissolver and then dispersed for 20 minutes in a commercially available laboratory sand mill (10 μm fineness).

C) Preparation of top coats

In the examples which follow, testing of the coatings is carried out as follows:

The pendulum hardness is determined by the König method.

Resistance to premium gasoline (FAM standard gasoline DIN 51,604) and xylene:

A small cellulose sheet (diameter about 35 mm) impregnated with the particular solvent is placed for the indicated time upon the coating (knife-coated on glass in the viscosity as obtained) and covered. The film is examined for softening and marking.

Damp heat resistance:

A phosphated steel sheet with the conventional structure (cathodic electrocoat primer, epoxy filler, top coat) is exposed for the indicated period to a humidity-saturated atmosphere at 40° C.

After one hour of regeneration time, the test sheet is examined for blisters and loss of gloss.

Sticking test:

One hour after forced drying of the coating, a strip of crepe adhesive tape is stuck on, firmly pressed on and left for one hour. After the adhesive tape has been torn off, the coating is examined for markings.

EXAMPLE 1

Formulation of a white top coat

| | |
|---|---|
| Acrylate resin I | 43.5 parts |
| White tinting paste P1 | 34.3 parts |
| Hexakis-(methoxymethyl)-melamine | 7.7 parts |
| Xylene | 13.8 parts |
| Commercially available silicone oil (5%) | 1.0 part |
| Pyridine salt of p-toluenesulfonic acid (20%) | 5.7 parts |

Adjustment diluent: xylene (18 sec DIN 4)

EXAMPLE 2

Formulation of a yellow top coat

| | |
|---|---|
| Acrylate resin I | 69.1 parts |
| Yellow tinting paste P2 | 14.0 parts |
| Hexakis-(methoxymethyl)-melamine | 12.0 parts |
| Xylene | 4.9 parts |
| Commercially available silicone oil (5%) | 1.0 part |
| Pyridine salt of p-tolulenesulfonic acid (20%) | 8.5 parts |

Adjustment diluent: xylene (18 sec DIN 4)

With forced drying (30 minutes at 60° C.), the following property level is reached (unless otherwise stated, the exposure tests were carried out one hour after removal from the drying oven).

| | White coat | Yellow coat |
|---|---|---|
| Layer thickness | 35 μm | 33 μm |
| Pendulum hardness 1 hour after drying | 55 sec | 50 sec |
| After 48 hours | 108 sec | 97 sec |
| Resistance to a premium gasoline and xylene (duration of exposure 5 minutes in each case) | no marking no softening | no marking after 24 hrs no softening |
| Sticking test (1 hour stressed with adhesive tape) | no marking | no marking |

EXAMPLE 3

Formulation of a white top coat

| | |
|---|---|
| Acrylate resin II | 36.8 parts |
| Hexakis-(methoxymethyl)-melamine | 7.3 parts |
| White tinting paste P3 | 29.4 parts |
| Butyl acetate | 7.6 parts |
| Butanol | 15.0 parts |
| Commercially available silicone oil (5%) | 1.0 part |
| p-toluenesulfonic acid (40%) | 2.9 parts |

Adjustment diluent: methoxypropyl acetate (18 sec DIN 4)

With forced drying (30 minutes at 60° C.), the following property level is reached (unless otherwise stated, the exposure tests were carried out 1 hour after removal from the drying oven).

| | |
|---|---|
| Layer thickness | 32 μm |
| Pendulum hardness 1 hour after drying | 95 sec |
| after 48 hours | 111 sec |
| Resistance to premium gasoline and xylene (duration of exposure 5 minutes in each case) | no marking. no softening |
| Sticking test (1 hour stressed with adhesive tape) | no marking |

With drying at 20° c. (room temperature), the following property level is reached:

| | |
|---|---|
| Resistance to premium gasoline and xylene after 3 days (duration of exposure 5 minutes in each case) | no marking, no softening |
| Exposure to damp heat, 260 hours at 40° C. | no blisters, good gloss retention |

EXAMPLE 4

Formulation of a white top coat

| | |
|---|---|
| Acrylate resin III | 39.4 parts |
| Hexakis-(methoxymethyl)-melamine | 7.4 parts |
| White tinting paste P3 | 29.4 parts |
| Methoxypropyl acetate | 3.0 parts |
| Butanol | 15.0 parts |
| Tetraline | 3.0 parts |
| Commercially available silicone oil (5%) | 1.0 part |
| p-toluenesulfonic acid (40%) | 1.8 part |

Adjustment diluent: methoxypropyl acetate (18 sec DIN 4)

With forced drying (30 minutes at 60° C.), the following property level is reached (unless otherwise stated, the exposure tests were carried out 1 hour after removal from the drying oven).

| | |
|---|---|
| Layer thickness | 35 μm |
| Pendulum hardness 1 hour ater drying | 91 sec |
| after 4 days | 126 sec |
| Resistance to premium gasoline and xylene (duration of exposure 5 minutes in each case) | no marking. no softening |

With drying at 20° C. (room temperature), the following property level is reached:

| | |
|---|---|
| Layer thickness | 33 μm |
| Pendulum hardness after 48 hours | 81 sec |
| After 24 hours: resistance to premium gasoline | no marking, no softening |
| Resistance to xylene (5 minutes exposure in each case) | slight marking |
| After 48 hours | no marking, |
| Resistance to premium gasoline | no softening |
| Resistance to xylene | no marking, no softening |
| Exposure to damp heat, 260 hours at 40° C. | no blisters, slight dulling |

EXAMPLE 5

Formulation of a white top coat

| | |
|---|---|
| Acrylate resin IV | 39.7 parts |
| Hexakis-(methoxymethyl)-melamine | 7.3 parts |
| White tinting paste P3 | 29.4 part |
| Butyl acetate | 4.8 parts |
| Butanol | 15.0 parts |
| Commercially available silicone oil (5%) | 1.0 part |
| p-toluenesulfonic acid (40%) | 2.8 parts |

Adjustment diluent: xylene (18 sec DIN 4)

With forced drying (30 minutes at 60° C.), the following product level is reached (unless otherwise stated, the exposure tests were carried out 1 hour after removal from the drying oven).

| | |
|---|---|
| Layer thickness | 36 μm |
| Pendulum hardness 1 hour after drying | 70 sec |
| after 24 hours | 77 sec |
| Resistance to premium gasoline and xylene (duration of exposure 5 minutes in each case) | no marking, no softening |

EXAMPLE 6

Formulation of a white top coat

| | |
|---|---|
| Acrylate resin | 38.6 parts |
| Hexakis-(methoxymethyl)-melamine | 7.3 parts |
| White tinting paste P3 | 29.4 parts |
| Butyl acetate | 5.9 parts |
| Butanol | 15.0 parts |
| Commercially available silicone oil (5%) | 1.0 part |
| p-toluenesulfonic acid (40%) | 2.8 parts |

Adjustment diluent: xylene (18 sec DIN 4)

With forced drying (30 minutes at 60° C.), the following property level is reached (unless otherwise stated, the exposure tests were carried out 1 hour after removal from the drying oven).

| | |
|---|---|
| Layer thickness | 33 μm |
| Pendulum hardness 1 hour after drying | 85 sec |
| after 24 hours | 98 sec |
| after 14 days | 155 sec |

-continued

| Resistance to premium gasoline and xylene (duration of exposure 5 minutes in each case) | no marking, no softening |
|---|---|

EXAMPLE 7

Formulation of a clear coating

| Acrylate resin | 68.1 parts |
|---|---|
| Hexakis-(methoxymethyl)-melamine | 10.2 parts |
| Xylene | 13.2 parts |
| Commercially available silicone oil (5%) | 1.0 part |
| Pyridine salt of p-toluenesulfonic acid (20%) | 7.5 parts |

Adjustment diluent: xylene (18 sec DIN 4)
With forced drying (30 minutes at 60° C.), the following property level is reached (unless otherwise stated the exposure tests were carried out 1 hour after removal from the drying oven).

| | Clear coating |
|---|---|
| Layer thickness | 32 μm |
| Pendulum hardness 1 hour after drying | 95 sec |
| after 48 hours | 111 sec |
| Resistance to premium gasoline and xylene (duration of exposure 5 minutes in each case) | no marking, no softening |
| Sticking test (1 hour stressed with adhesive tape) | no marking |

EXAMPLE 8

Formulation of a white top coat

| Acrylate resin VII | 42.0 parts |
|---|---|
| Hexakis-(methoxymethyl)-melamine | 7.7 parts |
| White tinting paste P3 | 30.8 parts |
| Butanol | 15.6 parts |
| Commercially available silicone oil (5%) | 1.0 part |
| p-toluenesulfonic acid (40%) | 2.9 parts |

Adjustment diluent: xylene (18 sec DIN 4)
With forced drying (30 minutes at 60° C.), the following property level is reached (unless otherwise stated, the exposure tests were carried out 1 hour after removal from the drying oven):

| Layer thickness | 32 μm |
|---|---|
| Pendulum hardness 1 hour after drying | 81 sec |
| after 6 days | 87 sec |
| Resistance to premium gasoline and xylene (duration of exposure 5 minutes in each case) | slight marking |
| After 48 hours | no marking no softening |

EXAMPLE 9

Formulation of a red top coat

| Acrylate resin III | 29.7 parts |
|---|---|
| Polyisocyanate (75%, triisocyanate from trimethylolpropane with 3 mol of toluylene diisocyanate, in ethyl acetate) | 26.5 parts |
| Red tinting paste | 25.0 parts |
| Butyl acetate | 18.75 parts |
| Ethylene diamine (10% in isopropanol) | 0.05 part |
| propanol) (sic) | |
| | 100.0 parts |

EXAMPLE 10

Formulation of a green top coat

| Acrylate resin I | 40.9 parts |
|---|---|
| Polyisocyanate (75%, triisocyanate from trimethylol propane with 3 mol of toluylene diisocyanate, in ethyl acetate) | 18.3 parts |
| Green tinting paste | 31.3 parts |
| Butyl acetate | 9.4 parts |
| Ethylenediamine (10% in isopropanol) | 0.1 part |
| | 100.0 parts |

With forced drying (30 minutes at 60° C.), the following property level is reached:

| | Example 9 | Example 10 |
|---|---|---|
| Layer thickness | 40 μm | 42 μm |
| Pendulum hardness | | |
| 6 hours after removal from the drying oven | 53 sec | 63 sec |
| 24 hours after removal from the drying oven | 137 sec | 126 sec |
| Resistance to premium gasoline and xylene (5 minutes exposure in each case, 6 hours after removal from the drying oven) | no marking, no softening | no marking, no softening |

EXAMPLE 11

Formulation of a green top coat

| Acrylate resin I | 45.8 parts |
|---|---|
| Polyisocyanate (Triisocyanate from 3 mol of hexamethylene diisocyanate, trimerized, 90% in 1:1 butyl acetate/solvent naphtha) | 13.4 parts |
| Green tinting paste | 31.2 parts |
| Butyl acetate | 9.52 parts |
| Ethylene diamine (10% in isopropanol) | 0.08 part |
| | 100.00 parts |

With forced drying (20 minutes at 120° C.), the following property level is reached:

| Layer thickness | 40 μm |
|---|---|
| Pendulum hardness | |
| 6 hours after removal from the drying oven | 90 sec |
| 24 hours after removal from the drying oven | 125 sec |
| Resistance to premium gasoline (5 minutes exposure, 6 hours after removal from the drying oven) | no marking no softening |
| Resistance to xylene, 5 minutes exposure in each case 6 hours after removal from the drying oven | very slight marking, very slight softening; |
| 24 hours after removal | no marking, |

| from the drying oven | no softening |
| --- | --- |

Pot life in a DIN 4 flow cup, rise from 20 seconds to 52 seconds in 24 hours.

The acrylate resins I and III are examined by photon-correlation spectroscopy for a content of microgel particles. The result of the examination is that there is no analytical indication of a microgel content. The resin solutions were examined by means of a Coulter Model N 4 sub-micron particle analyzer of Curtin Matheson Scientific Inc., Detroit, Mich., USA.

We claim:

1. A coating composition comprising:
   A) from about 55 to about 90% by weight of a pre-crosslinked hydroxylic acrylate copolymer comprising the reaction product of:
      a$^1$) from 10 to 60% by weight of at least one hydroxylic alkyl ester selected from the group consisting of hydroxyalkyl acrylic acid esters and hydroxyalkyl methacrylic acid esters having between 2 and 14 carbon atoms in the alkyl chain:
      a$^2$) from 3 to 25% by weight of at least one monomer having at least two polymerizable olefinically unsaturated bonds;
      a$^3$) from 15 to 82% by weight of at least one polymerizable monomer having one olefinically unsaturated bond, the sum of components a$^1$, a$^2$, and a$^3$ being 100% of said copolymer, and wherein said copolymer is ungelled; and
   B) from about 10 to 45% by weight of a cross-linking agent, the sum of A) and B) being 100% by weight of said coating composition.

2. The coating composition according to claim 1 wherein said acrylate copolymer is dispersed in a solvent to a polymerized solids content of about 40% to about 65% by weight and a viscosity of about 0.4 to about 10 dPas at 23° C.

3. The coating composition according to claim 2 wherein said cross-linking agent B) is a melamine/formaldehyde resin having a mean molecular weight from about 250 to about 1000 and a degree of methylolation of at least about 0.65, said resin being etherified with an etherifying agent to the extent of at least about 80 mol %, based on the maximum theoretical etherification.

4. The coating composition according to claim 3 wherein said etherifying agent B) is selected from the group consisting of monoalcohols having 1 to 4 carbon atoms and monoethers of diols having 2 to 7 carbon atoms.

5. The coating composition according to claim 3 wherein said hydroxylic alkyl ester comprises between about 25 and 40% by weight of said acrylate copolymer.

6. The coating composition according to claim 3 wherein said acrylate copolymer comprises between about 70 and 80% by weight of said coating composition.

7. The coating composition according to claim 3 which is further comprised of at least one member selected from the group consisting of pigments, fillers and catalysts.

8. A coating composition comprising:
   A) a pre-crosslinked hydroxylic acrylate copolymer comprising the reaction product of:
      a$^1$) from 10 to 60% by weight of at least one hydroxylic alkyl ester selected from the group consisting of hydroxyalkyl acrylic acid esters and hydroxyalkyl methacrylic acid esters having between 2 and 14 carbon atoms in the alkyl chain;
      a$^2$) from 3 to 25% by weight of at least one monomer having at least two polymerizable olefinically unsaturated bonds;
      a$^3$) from 15 to 82% by weight of at least one polymerizable monomer having one olefinically unsaturated bond, the sum of components a$^1$, a$^2$, and a$^3$ being 100% of said copolymer; and
   B) at least one polyfunctional isocyanate, the ratio of isocyanate groups in said polyfunctional isocyanate to hydroxyl groups in said pre-crosslinked acrylate copolymer being within the range of about 0.3:1 to about 3.5:1.

9. The coating composition according to claim 8 wherein said acrylate copolymer is dispersed in a solvent to a polymerized solids content of about 40% to about 65% by weight and a viscosity of about 0.4 to about dPas.

10. The coating composition according to claim 8 wherein said hydroxylic alkyl ester comprises between about 15 and 40% by weight of said acrylate copolymer.

11. The coating composition according to claim 8 which is further comprised of agents selected from the group consisting of organic solvents, pigments, fillers, additives, assistants, and catalysts.

* * * * *

UNITED STATES PATENT AND TRADEMARK OFFICE
CERTIFICATE OF CORRECTION

PATENT NO. : 5,093,408

DATED : March 3, 1992

INVENTOR(S) : W. Jung, et al.

It is certified that error appears in the above-identified patent and that said Letters Patent is hereby corrected as shown below:

Column 2, line 7, change "triacrylates" to --triacrylate--.

Column 4, line 66, change "-diocyanato" to --isocyanato--.

Column 5, line 4, change "propolymers" to --prepolymers--.

Column 12, line 3, change "ater" to --after--.

Signed and Sealed this

Seventh Day of September, 1993

Attest:

BRUCE LEHMAN

*Attesting Officer*       *Commissioner of Patents and Trademarks*